(12) United States Patent
Mangold et al.

(10) Patent No.: US 9,370,714 B2
(45) Date of Patent: Jun. 21, 2016

(54) LIGHT COMMUNICATION BETWEEN USER DEVICES AND PHYSICAL OBJECTS

(71) Applicant: Disney Enterprises, Inc., Burbank, CA (US)

(72) Inventors: Stefan Mangold, Liebefeld (CH); Giorgio Corbellini, Zurich (CH); Kenneth Mitchell, Earlston (GB)

(73) Assignee: DISNEY ENTERPRISES, INC., Burbank, CA (US)

( * ) Notice: Subject to any disclaimer, the term of this patent is extended or adjusted under 35 U.S.C. 154(b) by 245 days.

(21) Appl. No.: 13/969,075

(22) Filed: Aug. 16, 2013

(65) Prior Publication Data

US 2015/0050994 A1 Feb. 19, 2015

(51) Int. Cl.
*A63F 9/24* (2006.01)
*A63F 13/213* (2014.01)
*A63F 13/69* (2014.01)
*A63F 13/32* (2014.01)
*A63F 13/95* (2014.01)

(52) U.S. Cl.
CPC .............. *A63F 13/213* (2014.09); *A63F 13/32* (2014.09); *A63F 13/69* (2014.09); *A63F 13/95* (2014.09)

(58) Field of Classification Search
None
See application file for complete search history.

(56) References Cited

U.S. PATENT DOCUMENTS

| | | | | |
|---|---|---|---|---|
| 8,502,835 B1* | 8/2013 | Meehan | ............... | G06T 19/006 345/633 |
| 2006/0001543 A1* | 1/2006 | Raskar | ...................... | G01S 5/16 340/572.1 |
| 2010/0279768 A1* | 11/2010 | Huang | .................... | A63F 13/12 463/31 |
| 2011/0244964 A1* | 10/2011 | Glynne-Jones | ......... | A63F 13/12 463/40 |
| 2012/0077584 A1* | 3/2012 | Sarmenta | ................ | A63F 13/06 463/31 |
| 2012/0108332 A1* | 5/2012 | Baseley | .................. | A63F 13/06 463/31 |
| 2013/0235078 A1* | 9/2013 | Takahashi | ............... | G06T 11/00 345/633 |
| 2014/0225916 A1* | 8/2014 | Theimer | ............... | G06T 19/006 345/633 |

* cited by examiner

*Primary Examiner* — Jason Yen
(74) *Attorney, Agent, or Firm* — Sheppard Mullin Richter & Hampton LLP

(57) ABSTRACT

Systems and methods for communicating information between user devices and physical objects which are separate from the user devices. The physical objects may store information related to one or more online games associated with the physical objects. The user devices may obtain the information stored by the physical objects via light communication. The user devices may use the obtained information in order to effectuate presentation of a virtual character and/or virtual object in an online game corresponding to the information.

19 Claims, 7 Drawing Sheets

LIGHT COMMUNICATION BETWEEN USER DEVICES AND PHYSICAL OBJECTS

FIELD OF THE DISCLOSURE

This disclosure relates to systems and methods for communication between user devices and physical objects separate from the user devices, and more particularly to visible light communication between user devices and physical objects such that the user devices can obtain information about the physical objects from the physical objects corresponding to an online game.

BACKGROUND

Relating physical objects to virtual environments can enrich a user's experience with both the physical object and the virtual environment. The physical objects may be used to store information relating to the physical object and the virtual environment. The virtual environment may be an online game. The physical objects may depict a virtual character used in the online game. The information stored by the physical objects relating to a virtual character in the online game may be obtained in order to effectuate presentation of aspects of the virtual character and/or online game, which correspond to the information associated with the physical objects and/or stored by the physical objects. Typically, information has been transferred between the physical objects and a client device used to access a virtual environment through radio-frequency communication (e.g., through an RFID tag within the physical object, and an RFID reader attached to the client device).

SUMMARY

One aspect of the disclosure relates to a system for obtaining information relating to online games from physical objects storing the information using light communication. In some implementations, light may be communicated as one or more of visible light, infrared (IR) light, near-infrared light, and/or other light spectrum suitable for the intended purposes of the invention. The system may include a user device comprising a camera, photo diode, and/or other sensor(s) configured to capture modulated light emitted from a physical object that is separate from the user device, one or more light sources, one or more processors configured to execute computer program modules, and/or other features and/or components. The computer program modules may include one or more of a translation module, a game module, an augmented reality module, a write module, and/or other modules.

The translation module may be configured to analyze one or more parameters of the modulated light. The translation module may be configured to determine from the one or more parameters of the modulated light, the information associated with the physical object.

The game module may be configured to effectuate display of a game to a user. The game module may be configured to use the game-relevant information determined by the translation module to effectuate presentation of a character or virtual object in the game that corresponds to the physical object.

The augmented reality module may be configured to effectuate display of augmented realty simulations of the physical object to the user.

The write module may be configured to compile updated game-relevant information associated with the physical object. Updated game-relevant information may be a result of gameplay in the online game. The updated game-relevant information may be configured for sending to the physical objects such that the physical objects can update stored game-relevant information with the updated game-relevant information. The write module may be configured to encode the updated game-relevant information into modulated light for communication to the physical objects. The write module may be configured to effectuate illumination of the light sources of the user devices in accordance with the light signals corresponding to the encoded updated game-relevant information.

Another aspect of the disclosure relates to a method for obtaining information relating to online games from physical objects using light communication. The method may be implemented in a user device that includes one or more physical processors and storage media storing machine-readable instructions. The method comprise the steps of analyzing one or more parameters of modulated light captured from a physical object which is separate from the user device; determining from the one or more parameters of the modulated light, game-relevant information associated with the physical object; effectuating display of a game to a user; effectuating presentation of a character or virtual object in the game that corresponds to the physical object using the game-relevant information, and/or other operations.

Another aspect of the disclosure relates to a system for communicating information relating to online games from physical objects to user devices associated with users of the online game. The system may include a physical object comprising one or more light sources, one or more light sensors, one or more processors configured to execute computer program modules, and/or other features and/or components. The computer program modules may comprise one or more of a storage module, an illumination communication module, a receiving module, and/or other modules.

The storage module may be configured to store game-relevant information associated with the physical object corresponding to an online game.

The illumination communication module may be configured to manage one or more parameters of the modulated light generated by the one or more light sources. The one or more parameters of the modulated light may be used to encode the game-relevant information associated with the physical object for communication to user devices.

The receiving module may be configured to receive updated game-relevant information from a user device that is separate from the physical object. Responsive to receiving the updated information by the receiving module, the storage module may be configured to update the stored game-relevant information with the updated game-relevant information.

Another aspect of the disclosure relates to a method for communicating information relating to online games from physical objects to user devices associated with users of the online game. The method may be implemented on physical objects that include one or more light sources, one or more physical processors, storage media storing machine-readable instructions, and/or other features and/or components. The method may comprise the steps of storing game-relevant information associated with the physical object corresponding to an online game; managing one or more parameters of the modulated light generated by the one or more light sources, wherein the one or more parameters of the modulated light are used to encode the game-relevant information associated with the physical object; receiving updated game-relevant information from a user device that is separate from the physical object, and responsive to receiving the information, updating the stored game-relevant information with the updated game-relevant information; and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
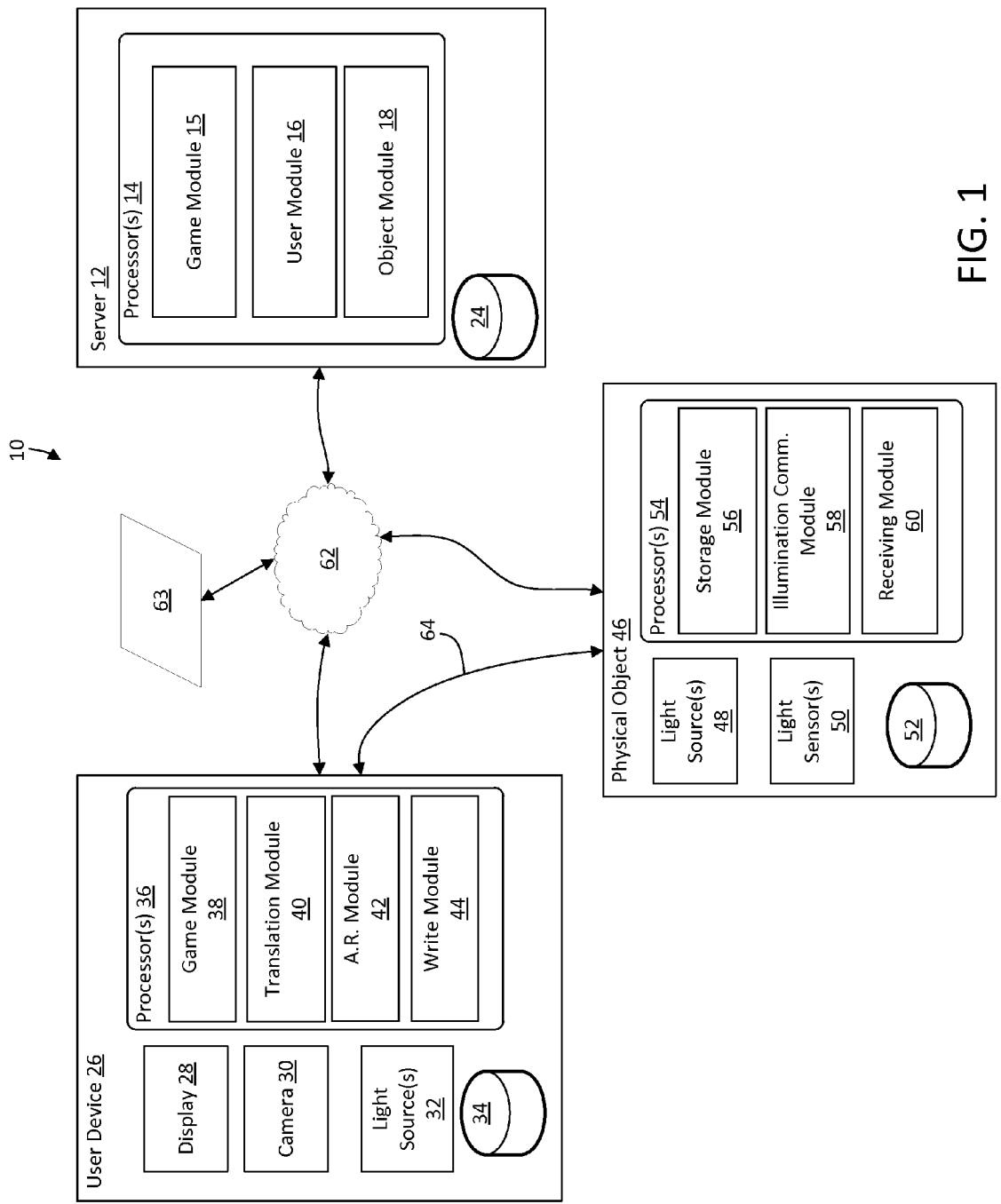
FIG. 1 illustrates a system for visible light communication between a user device and a physical object separate from the user device, such that the user device can determine game-relevant information about the physical object corresponding to an online game.

FIG. 1 illustrates a system 10 for light communication between user devices 26 and physical objects 46, such that the user devices 26 can obtain information stored by the physical objects 46. The information may include information which associates the physical objects 46 with a virtual environment. The virtual environment may include, for example, an online game. The information may include game-relevant information stored by the physical object 46 which associates the physical object 46 to one or more online games. For this purposes of this disclosure, the communication of light will herein refer to visible light communication, however it is to be understood that in some implementations, the system 10 may be configured for light communication in other spectrums such as infrared (IR) light, near-infrared light, and/or other light spectrum suitable for the intended purposes of the invention described herein.

User devices 26 may include one or more of a cellular telephone, a smartphone, a laptop, a tablet computer, a desktop computer, a television set-top box, smart TV, a gaming consul, and/or other device suitably configured to carry out the various aspects of the system 10 described herein. The user devices 26 may include devices comprising one or more of a visual display 28, a camera 30, one or more light sources 32 (e.g., LED's), electronic storage 34, processing capabilities (e.g., one or more processors 36), and/or other features. It is noted that in some implementations, the functionality of the camera 30 may be provided by a conventional camera, one or more photo diodes, a depth camera, and/or other sensor component(s) which are suitable for carrying out the various features of the system 10 described herein. In some implementations, one or more sensors may be provided as a one or more peripheral devices configured for engagement to the user devices 26. In such implementations, the peripheral devices may be attributed with some or all of the functionality of the camera 30.

The physical objects 46 may be standalone physical objects. The physical objects 46 may be associated with virtual entities in the virtual environment. The virtual entities may comprise virtual characters, powers, abilities and/or skills that can be applied to the virtual characters, virtual objects, virtual items, simulated physical phenomena, and/or other virtual content. In some implementations, a physical object 46 may be configured to depict a given character (e.g., Mickey Mouse). A given physical object 46 may be a toy figurine embodying the appearance of the given character. In some implementations, physical objects 46 may be detectable by user devices 26 such that the physical objects 46 can communicate with the user devices 26. In some implementations, detection of a physical object 46 may be based on a shape of a portion of the physical objects and/or by detection of a shape or object at or near the physical object by a camera or other image capturing technique of the user device 26. In some implementations, a physical object 46 may be detectable based on a signal conveying information (e.g., game-relevant information) associated with the physical object 46. The physical object 46 may include one or more light sources 48 configured to emit modulated visible light signals to one or more user devices 26. The modulated light signals may be characterized by one or more parameters. The one or more parameters may be characterized by one or more of a frequency, color, or intensity relating to the emitted light. Detection of a physical object 46 by the user devices 26 may be facilitated by electronics embedded within or otherwise included in the given physical object. For example, the physical object 46 may include a radio-frequency identification (RFID) chip (not shown) configured to emit radio-frequency electromagnetic fields responsive to the physical object 46 being disposed in proximity to one or more user devices 46.

Game-relevant information stored by the physical objects 46 which is communicated to the user devices 26 may be information which is stored exclusively by the physical object, stored by the physical object and one or more host servers which execute the online games, and/or other considerations. Game-relevant information may be information which can be updated based on user gameplay within the one or more online games associated with the physical object 46. Updates may be applied to the information stored by the physical object 46 after and/or during gameplay of an online game associated with the physical objects 46. Game-relevant information may include one or more of identification information, game progress information, co-play information, and/or other information associated with the physical object and/or one or more online games.

Identification information may include information which correlates the physical object 46 with a user of a user device 26, a virtual character which can be manifested within an instance of the online game, and/or other correlation. The virtual character may be associated with one or more of a character type and/or other character information. The identification information may include information used to correlate the physical object 46 to information related to powers, abilities and/or skills that can be applied to the virtual character, virtual items and/or virtual currency associated with the virtual character, and/or other information associated with the physical object. Identification information may include one or more of a user name, a user ID number, and/or other information used to correlate the physical object with a user of a user device and/or one or more virtual characters and/or other entities associated with an online game.

Game progress information may include information relating to gameplay progress in the online game. Gameplay progress may relate to progress of the correlated virtual characters in the online game. Game progress information may include progress related to the completion and/or interaction with one or more of game levels, tasks, missions, status's, and/or other information related to progress in an online game.

Co-play information may include information related to user interaction with one or more other users (e.g., players) of the online game. Co-play information may include information related to the interaction of a virtual character associated with a user and virtual characters associated with other users of the online game. Co-play information may include information related to the interaction of a virtual character corresponding to a physical object and other virtual characters corresponding to other physical objects. Co-play information may include information related to past communications by the user with other users, including past in-game player-to-player communications.

The virtual environment may be provided through an execution of computer program modules on the user device (e.g., "offline" mode of gameplay) and/or by a remote server comprising one or more physical processors configured to execute computer program modules for executing an instance of the online game and facilitating participation of users in the online game (e.g., "online" mode of gameplay).

In FIG. 1, in some implementations, providing the virtual environment may include hosting the virtual environment over a network 26, such as the Internet. A host server may include one or more processors configured to execute one or more computer modules for implementing an instance of an online game and to facilitate the participation of one or more users in the online game. The host server may be a game server 12. The game server 12 may include one or more processors, such as processor 14.

The computer program modules may include one or more of a game module 15, user module 16, object module 18, and/or other modules. The server 12 may be configured to communicate with one or more user devices 26, according to client/server architecture. The server 12 may be configured to communicate with one or more physical objects 46. The users may access system 10 and/or the virtual environment hosted by server 12 via the user devices 26.

The game module 15 may be configured to implement an instance of the virtual environment executed by the computer modules to determine state of the virtual environment. The state may then be communicated (e.g., via streaming visual data, via object/position data, and/or other state information) from server 12 to user devices 26 for presentation to users. The state determined and transmitted to a given user devices 26 may correspond to a view for a user character (e.g., a character associated with a physical object 46) being controlled by a user via input devices (e.g., a controller) at the given user device 26. The game module 15 may be configured to use game-relevant information associated with the physical object 46 (e.g., the game-relevant information stored by the physical objects 46 and obtained by the user devices 46) to effectuate presentation of a virtual character and/or virtual object in the game that corresponds to the physical object 46. The state determined and presented to a given user device 26 may correspond to a location in the virtual environment (e.g., location in the game). The view described by the state for the given user device 26 may correspond, for example, to the location from which the view is taken, the location the view depicts, and/or other locations, a zoom ratio, a dimensionality of objects, a point-of-view, and/or view parameters of the view. One or more of the view parameters may be selectable by the user.

An instance of the virtual environment may comprise a simulated environment that is accessible by users via clients (e.g., user devices 26) that present the views of the virtual environment to a user. The simulated environment may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the environment, and/or surface features of a surface or objects that are "native" to the environment. In some instances, the topography may describe a surface (e.g., a ground surface) that runs through at least a substantial portion of the environment. In some instances, the topography may describe a volume with one or more bodies positioned therein (e.g., a simulation of gravity-deprived environment with one or more celestial bodies positioned therein). An instance executed by the computer modules may be synchronous, asynchronous, and/or semi-synchronous.

The above description of the manner in which state of the virtual environments is determined by game module 15 of the server 12 is not intended to be limiting. The game module 15 may be configured to express the virtual environment in a more limited, or more rich, manner. For example, views determined for the virtual environment representing the state of the instance of the virtual environment may be selected from a limited set of graphics depicting an event in a given place within the virtual environment. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual environment are contemplated.

Within the instance(s) of the virtual environment executed by game module 15, users may control characters, objects, simulated physical phenomena (e.g., wind, rain, earthquakes, and/or other phenomena), and/or other elements within the virtual environment to interact with the virtual environment and/or each other. The user characters may include avatars. As used herein, the term "user character" may refer to an object (or group of objects) present in the virtual environment that represents an individual user. A user character may refer to a virtual character capable of manifestation in an instance of the online game which corresponds to a physical object 46. The user character may be controlled by the user with which it is associated. The user controlled element(s) may move through and interact with the virtual environment (e.g., non-user characters in the virtual environment, other objects in the virtual environment). The user controlled elements controlled by and/or associated with a given user may be created and/or customized by the given user. The user may have an "inventory" of virtual items and/or currency that the user can use (e.g., by manipulation of a user character or other user controlled element, and/or other items) within the virtual environment.

The users may participate in the instance of the virtual environment by controlling one or more of the available user controlled elements in the virtual environment. Control may be exercised through control inputs and/or commands input by the users through user devices 26. The users may interact with each other through communications exchanged within the virtual environment. Such communications may include one or more of textual chat, instant messages, private messages, voice communications, and/or other communications. Communications may be received and entered by the users via their respective user devices 26. Communications may be routed to and from the appropriate users through server 12 (e.g., through game module 16) and/or through communications which are external to the system 10 (e.g., text messaging service within the user devices 26).

The user module 16 may be configured to access and/or manage one or more user accounts and/or user information associated with users of the system 10. The one or more user accounts and/or user information may include information stored by server 12, one or more of the user devices 26, and/or other, one or more physical objects 46, and/or other storage locations. The user accounts may include, for example, information correlating users to physical objects associated with the users (e.g., a username or handle, a number, an identifier, and/or other identifying information) within the virtual environment, security login information (e.g., a login code or password), virtual space account information, subscription information, virtual currency account information (e.g., related to currency held in credit for a user), relationship information (e.g., information related to relationships between users and user 'friends' in the virtual environment), virtual environment usage information (e.g., a log-in history indicating the frequency and/or amount of times the user logs-in to the user accounts, information relating to the usage of the physical objects corresponding to the online game), demographic information associated with users, interaction history among users in the virtual environment, information stated by users, browsing history of users, a client computing platform identification associated with a user, a phone number associated with a user, and/or other information related to users.

The object module 18 may be configured to manage a database of information corresponding to the physical objects associated with the online game. The object module 18 may manage information related to the individual physical objects 46. For example, the object module 18 may manage physical object 46 information such as the object type, object ID information, and/or other information associated with the individual physical objects 46. Object ID information may be the same or similar as the information which correlates the users to the physical objects associated with the users as stored by the user module 16 herein, and/or other information to identify the physical objects and correlate the users to the physical objects 46.

Figure 4:
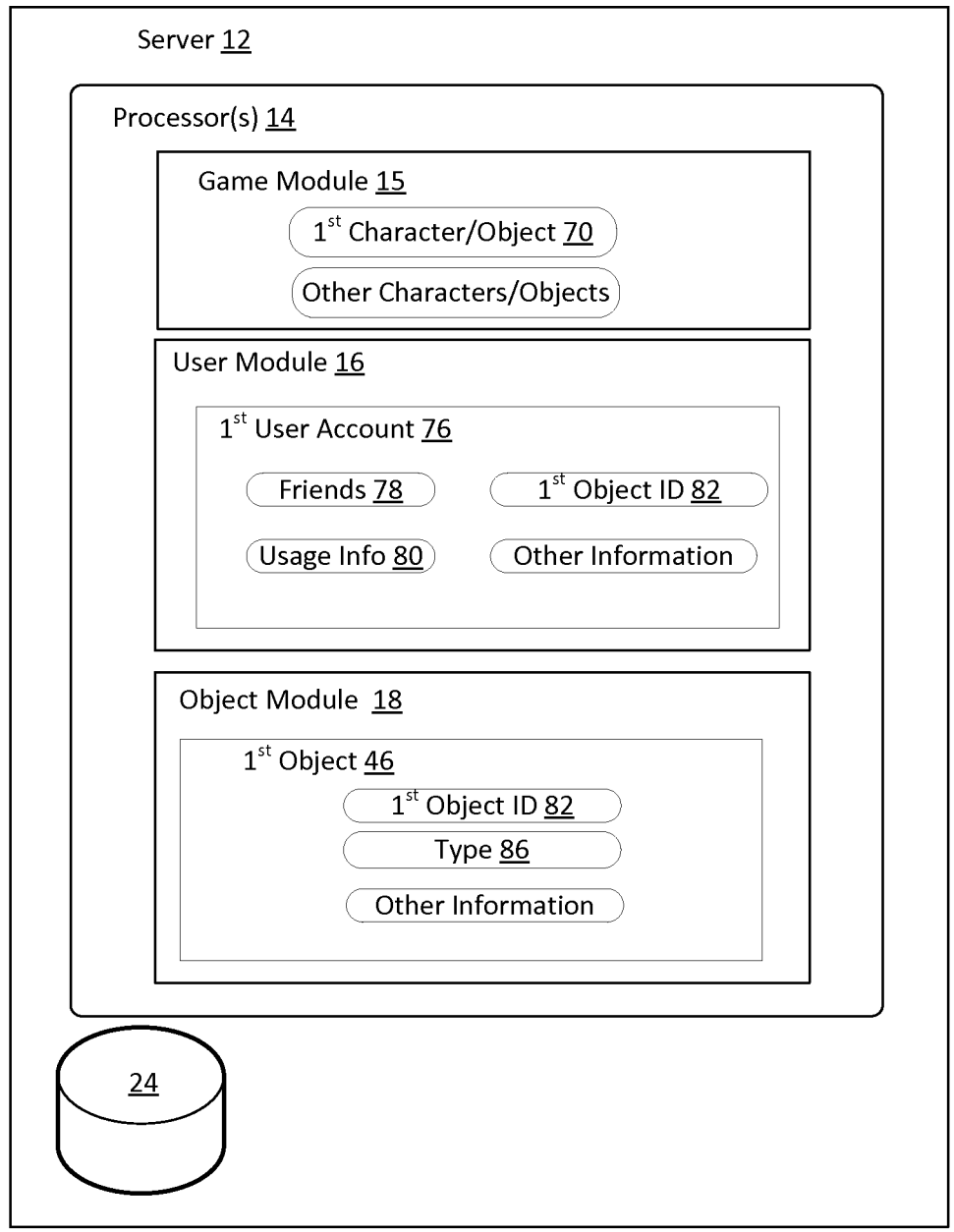
FIG. 4 illustrates in more detail a depiction of a game server used in the system of FIG. 1.

By way of illustration, referring now to FIG. 4, the user module 16 may be configured to manage user accounts such as a first user account 76 corresponding to a user associated with a given physical object (e.g., physical object 46 of FIG. 1). Information stored within the first user account 76 may include one or more of information related to the friends 78 of the user (e.g., other users who participate in the online game with the user associated with the first user account 76), usage information 80 (e.g., a log-in history indicating the frequency and/or amount of times the user logs-in to the user accounts, information relating to the usage of the given physical object corresponding to gameplay in the online game, and/or other information), a first object identification 82 for correlating a given physical object (e.g., physical object 46 of FIG. 1) to the user of the first user account 76 associated with the given physical object, and/or other information. The object module 18 may be configured to manage object information such as information for a first given physical object 46. The information managed by the object module 18 for the given physical object 46 may include first object identification 82, the physical object type 86, and/or other information. The first object identification 82 may be information used to correlate the user associated with the first user account 76 and the given physical object 46 with the information about the physical objects 46 stored by object module 18 (e.g., correlated by comparing the first object identification 82 within the object module 18 and the first object identification 82 within the first user account 76, and/or other correlation). The game module 15 may be configured to use game-relevant information corresponding to the physical object 46 (e.g., the game-relevant information stored by the physical objects 46 and obtained by the user devices 46) to effectuate presentation of a first virtual character and/or virtual object 70, and/or other objects in the game that correspond to the physical object 46.

Returning to FIG. 1, in some implementations, providing the virtual environment may include hosting the virtual environment on the user devices 26. The user devices 26 may include one or more processors 36 configured to execute one or more computer modules for implementing an instance of an online game and to facilitate the participation of the user of the user device 26 in the online game. Hosting the virtual environment on the user devices 26 may provide an "offline" mode of gameplay for the users of the user devices 26 (e.g., with or without communication with the game server 12).

The computer program modules may include one or more of a game module 38, translation module 40, augmented reality module 42, write module 44, and/or other modules. The user devices 26 may be configured to communicate with one or more servers (e.g., server 12) according to client/server architecture (e.g., via network 62). The user devices 26 may be configured to communicate with one or more physical objects 46. The user devices 26 and physical objects 46 may be configured to communicate via visible light communication techniques described herein, and/or by other communication techniques. The users may access the virtual environment via the hosting provided by server 12 as described previously, via "offline" gameplay (e.g., hosting provided by the user devices 26) described below, and/or by other considerations. The user devices 26 may include a camera 30 configured to capture modulated, visible light emitted from the physical objects 46. In some implementations, capturing the visible light may accomplished via photo diodes, a depth camera, and/or other suitable sensor(s).

The game module 38 may be configured to locally implement an instance of the virtual environment executed by the computer modules to determine state of the virtual environment. The game module 38 may be configured to implement the instance of the virtual environment the same as or similar to the implementation of the instance of the virtual environment executed by the game server 12 (e.g., game module 15). Hosting the virtual environment locally on the user devices 26 may provide offline gameplay which is only accessible to the user of the user device 26 (e.g., does not access the server 12 which is configured for access and interaction by multiple users). The game module 38 may include information which is stored locally and/or other information required for implementing an instance of the online game in the offline (e.g., local) manner. The game module 38 may be configured to effectuate display of a game to the user of the user device 26 via the display of the user device 26. The game module 38 may be configured to use game-relevant information corresponding to the physical object 46 (e.g., the game-relevant information determined by the translation module 40) to effectuate presentation of a virtual character and/or virtual object in the game that corresponds to the physical object 46.

In an online mode, the game module 38 may be configured such that executing the instance of the online game comprises accessing the execution of the online game performed by the game server 12 such that views of the instance of the online game determined by the game module 15 of the server 12 are accessed (e.g., via network 62) by the game module 38 of the user device 26 for presentation thereon.

The translation module 40 may be configured to analyze one or more parameters of the modulated, visible light, emitted from the physical objects 46 which is captured by the camera 30. Analyzing the one or more parameters of the visible light may include determining from the one or more parameters of the modulated, visible light, game-relevant information associated with the physical object 46. The visible light signals may be characterized by one or more of a frequency, color, or intensity, such that modulating these parameters of visible light allows the physical objects 46 to encode the game-relevant information in the visible light signal for reception by the camera 30 of the user devices 26. After the translation module 40 determines the game-relevant information, the game module 38 may use the game-relevant information to effectuate presentation of a virtual character and/or virtual object in an "offline" mode of gameplay (e.g., hosting by the user devices 26), and/or the game module 15 of the game server 12 may use the game-relevant information to effectuate presentation of a virtual character and/or virtual object in an "online" mode of gameplay (e.g., hosting by the server 12). For online gameplay, the user devices 26 may communicate the determined game-relevant information to the server 12 (e.g., via network 62) such that the server 12 (e.g., game module 15) can use the game-relevant information to manifest the virtual character and/or virtual object corresponding to the physical object 46 and game-relevant information associated with the character and/or object.

Gameplay in one or both of the online or offline modes may cause game-relevant information associated with user characters and/or objects to change and/or alter. For example, gameplay may include users completing levels (and/or other progress), such that game-relevant information may comprise game progress information indicating the users' progress in completing levels may change accordingly (e.g., to reflect the advancement in game levels). Changes in game-relevant information due to gameplay in one or both of online and offline gameplay may require an update in the game-relevant information such that game-relevant information stored by the physical objects 46 may also be updated accordingly.

The write module 44 may be configured to compile updated game-relevant information associated with gameplay in one or both of online or offline gameplay corresponding to the virtual characters and/or objects associated with the physical objects 46. The complied updates to the game-relevant information may be configured for sending to the physical object 46 such that the game-relevant information stored by the physical objects 46 can be updated accordingly. In some implementations, user devices 26 may comprises one or more visible light sources 32 (e.g., LED's, and/or other source) such that the write module 44 is further configured to encode the updated game-relevant information into modulated, visible light signals to be generated by the one or more light sources 32 for sending to and reception by the physical objects 46 (e.g., visible light communication 64). The updated game-relevant information may be communicated to the physical objects 46 by other communication techniques.

The augmented reality module 42 may be configured to effectuate display of augmented realty simulations of the physical objects 46 on the display 28 of the user devices 26 for viewing by the users. The user devices 26 may detect the physical objects 46 (e.g., via camera 30) such that the user devices 26 can effectuate augmented reality simulations of the physical objects 46 on the displays 28. Detection of a physical object 46 may be based on a shape of a portion of the physical objects 46. For example the camera 30 may detect a general shape and/or defining features of the physical objects 46 such that the augmented reality module 42 can effectuate the appropriate simulation. For example, if the physical object 46 depicts a given character (e.g., Mickey Mouse), the camera 30 may detect a defining feature of the physical object 46 (e.g., mouse ears), such that the augmented reality module 42 can effectuate display of appropriate augmented reality simulations of the physical object 46 (e.g., simulations of Mickey Mouse). The camera 30 may detect the shape via conventional image detections techniques, and/or other techniques.

Detection of the physical objects 46 may include the detection of a shape or object at or near which the physical object 46 is placed (e.g., as capture by the camera 30). In some implementations the physical objects 46 may be of a shape or form which may require advanced object detection methods which are not suitable for processing by the user devices 26 (e.g., due to processing limitations of the user devices 26 and/or other limitations). In some implementations, the physical objects 46 may be placed at or near objects and/or shapes to allow the user device capturing an image of the physical objects 46 to register the orientation of the physical objects 46 such that the user devices 26 (e.g., camera 30) can more easily detect the general shape and/or defining feature of the given physical object 46, based on the detected registered orientation.

Figure 5:
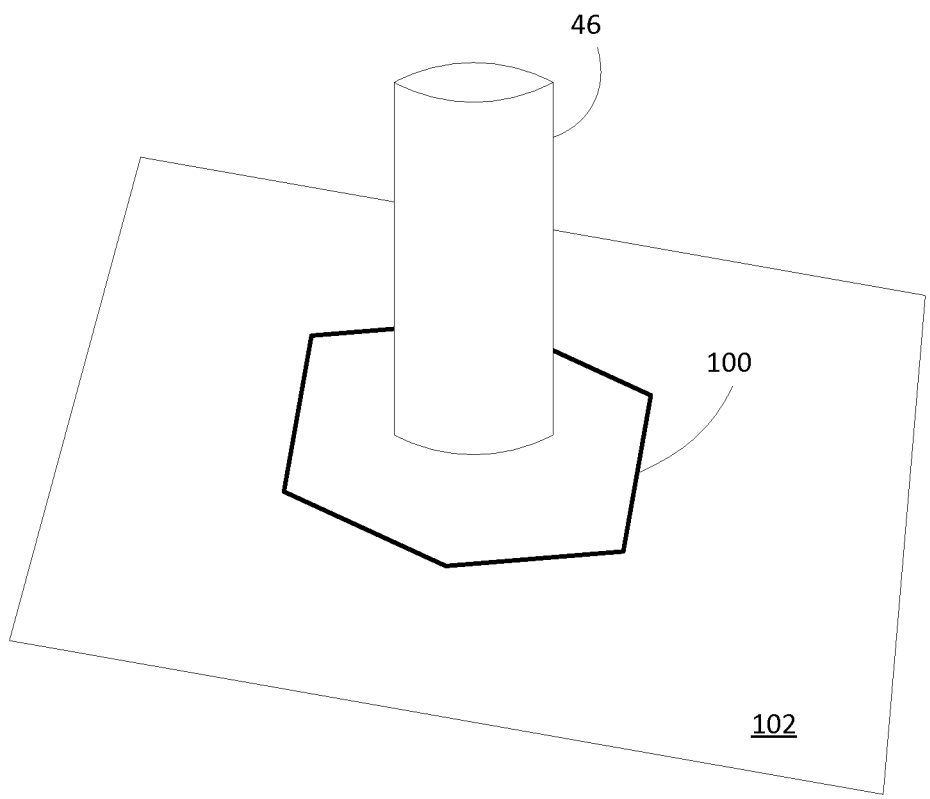
FIG. 5 illustrates a depiction of a physical object being placed on a surface comprising a shape, used for registering an orientation of the physical object when capturing an image thereof using a user device.

For example, referring now to FIG. 5, the physical object 46 may be placed at or near a shape 100, such that the position of the physical object 46 with respect to the shape 100 will allow the user device 26 capturing an image of the physical object 46 to determine an orientation of the physical object 46 with respect to the user device 26 (e.g., camera 30). Thereafter the augmented reality module 42 can effectuate an appropriate display of an augmented reality simulation based off the detected orientation of the physical object 46.

The shape 100 may comprise indicia which is printed, drawn, traced, painted, and/or otherwise imparted on a surface, such as surface 102. The shape 100 may comprise a shape having a regular form (e.g., a polygon). The surface 102 may be a sheet of paper, the ground, a table top, and/or other supportive surface.

Figure 3:
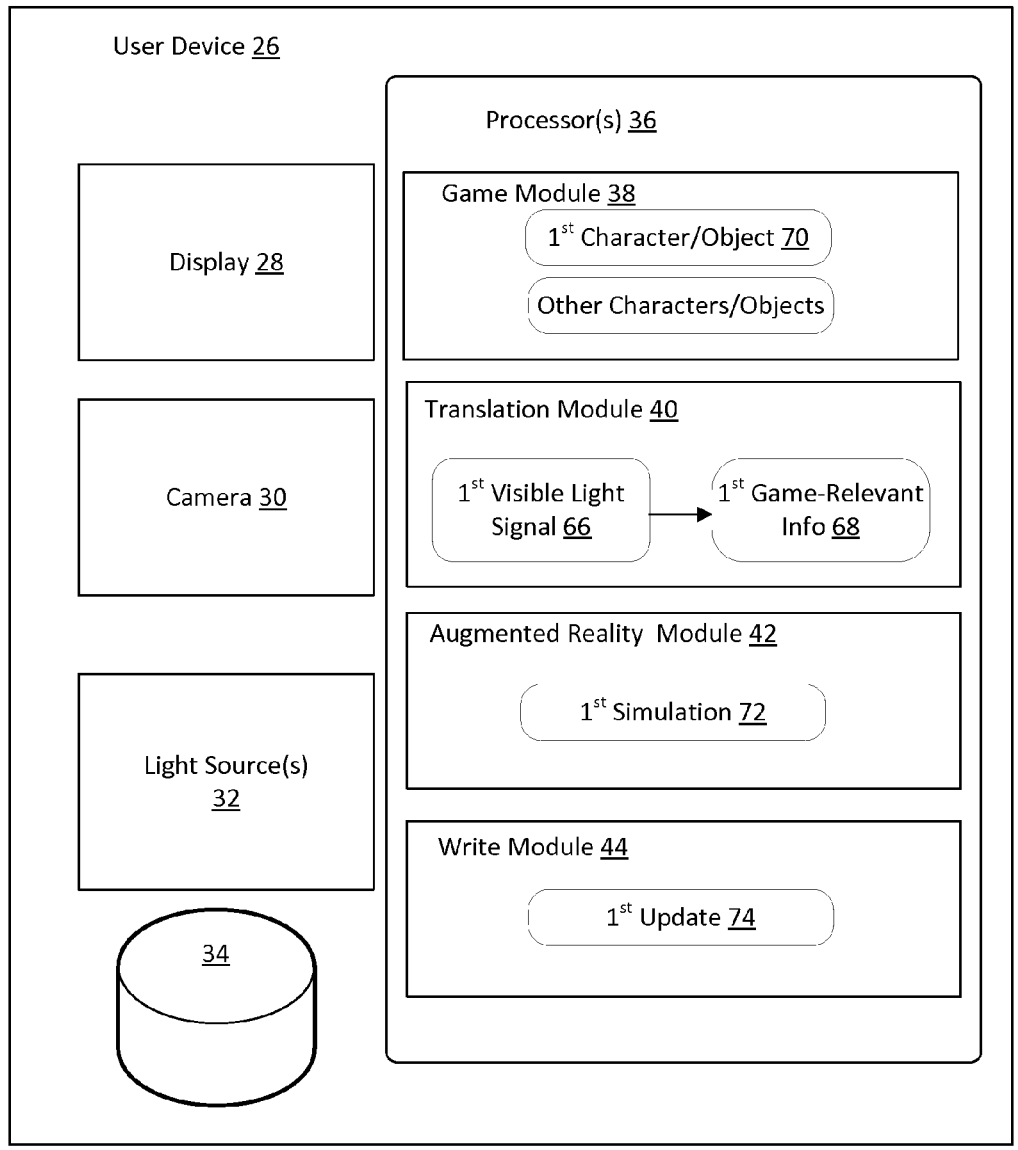
FIG. 3 illustrates in more detail a depiction of a user device used in the system of FIG. 1.

Referring now to an illustrative example shown in FIG. 3, a given user device 26 may capture a first modulated, visible light signal 66 from a physical object (e.g., via camera 30). The translation module 40 may be configured to analyze one or more parameters of the first modulated, visible light signal 66 emitted from the physical object. The translation module 40 may be configured to determine from the one or more parameters of the first modulated, visible light signal 66, first game-relevant information 68 associated with physical object. Thereafter, the game module 38 may be configured use the first game-relevant information 68 to effectuate presentation of a first virtual character and/or virtual object 70 in a game. In an offline gameplay mode, the game module 38 executes an offline instance of the online game and effectuates presentation of the first virtual character and/or object 70 in the game.

In an online gameplay mode, the game module 38 may communicate the first game-relevant information 68 to the game server (e.g., server 12 of FIG. 1) such that the remote server can use the first game-relevant information 68 to manifest a virtual character and/or object associated therewith in the game executed by the server. The game module 38 may receive views of the online game determined by the game server for presentation of the game on the user device 26.

Based on gameplay in one or both of online and offline gameplay modes, the game-relevant information may require updates. The write module 44 may be configured to compile first updated game-relevant information 74 for sending to the physical object. In some implementations wherein the user device additionally comprises one or more visible light sources 32, the write module 44 may be further configured to encode the first updated game-relevant information 74 into modulated, visible light signals to be generated by the one or more light sources 32 for reception by the physical object. The write module 44 may be configured to effectuate illumination of the light sources 32 in accordance with the encoded light signals. In some implementations, the user devices 26 may be configured to communicate updated game-relevant information by other communication techniques.

The augmented reality module 42 may be configured to effectuate display of a first augmented realty simulation 74 corresponding to a detection of the physical object by the camera 30, on the display 28 of the user device 26.

Returning to FIG. 1, in some implementations, the physical objects 46 may include one or more light sources 48, one or more light sensors 50, electronic storage 52, one or more processors 54 configured to execute one or more computer modules, and/or other features.

The computer program modules may include one or more of storage module 56, illumination communication module 58, receiving module 60, and/or other modules. The physical objects 46 may be configured to communicate with one or more servers (e.g., server 12) according to client/server architecture (e.g., via network 62). The physical objects 46 may be configured to communicate with one or more user devices 26 via visible light communication techniques described herein, and/or via other communication techniques.

The storage module 56 may be configured to store game-relevant information associated with the physical objects 46. The game-relevant information may include information which associates the physical objects 46 with one or more virtual characters and/or virtual objects which correspond to an online game.

The illumination communication module 58 may be configured to manage one or more parameters of the modulated, visible light to be generated by the one or more light sources 48. The one or more parameters of the modulated, visible light may be used to encode game-relevant information into visible light signals for sending to the user devices 26. The visible light signals may be characterized by one or more of a frequency, color, or intensity.

The receiving module 60 may be configured to receive updated game-relevant information from a user device 26 that is separate from the physical object 46. The receiving module 60 may be further configured such that receiving the updated game-relevant information from the user devices 26 comprises receiving, by the one or more light sensors 50, modulated visible light signals generated from the user device 26. The receiving module 60 may be configured to analyzing one or more parameters of the received modulated, visible light to determine from the one or more parameters of the modulated, visible light signals updated game-relevant information encoded therein. The receiving module 60 may be configured to receive updated game-relevant information by other techniques. Responsive to the receiving module 60 receiving the updated game-relevant information, the storage module 56 may be configured to update the stored game-relevant information with the received updated game-relevant information accordingly.

Figure 2:
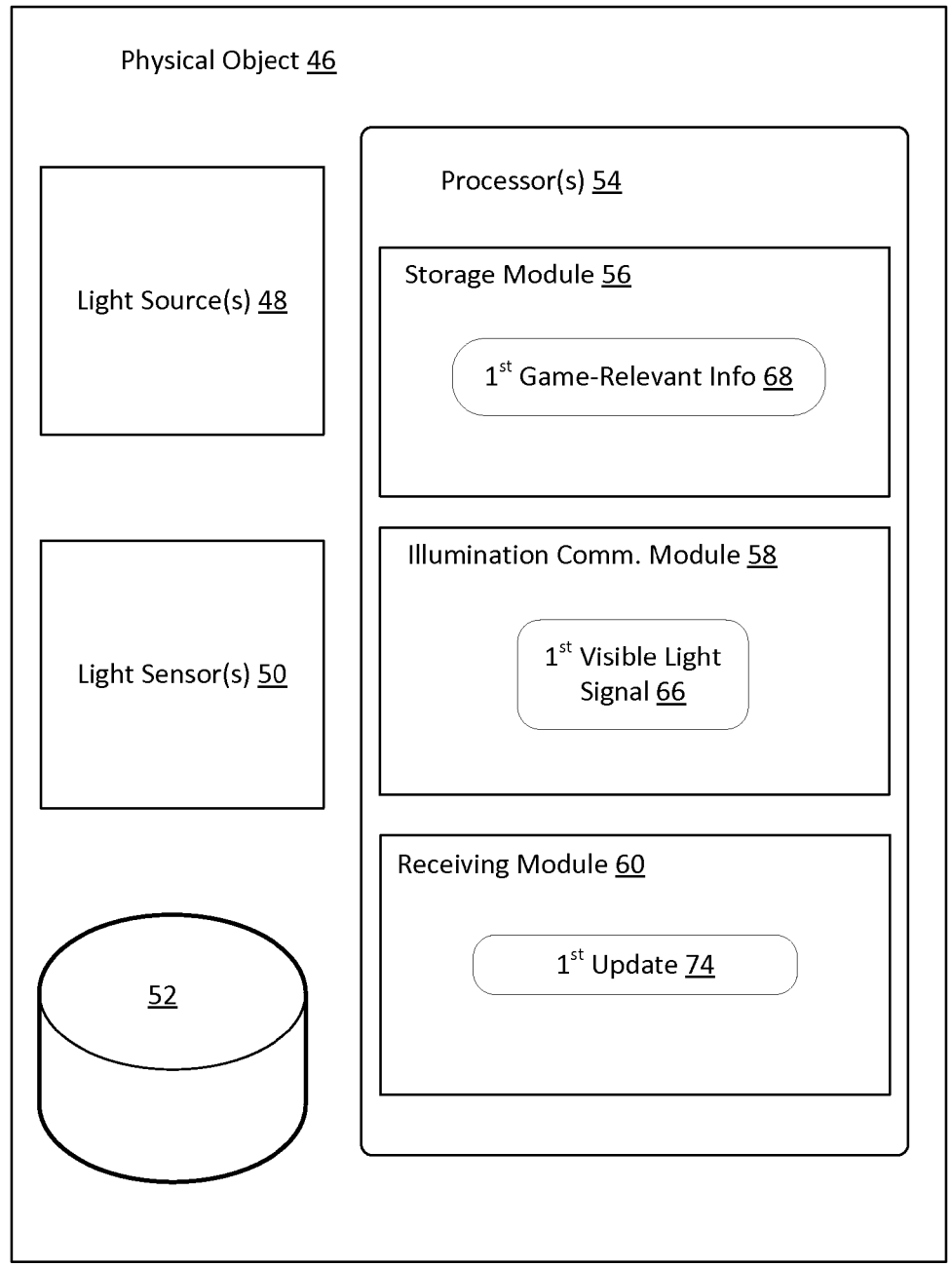
FIG. 2 illustrates in more detail a depiction of a given physical object used in the system of FIG. 1.

By way of illustrations, FIG. 2 depicts a given physical object 46 wherein the storage module 56 is configured to store first game-relevant information 68 corresponding to the physical objects 46 which associates the physical object 46 with an online game. The illumination communication module 58 may be configured to manage one or more parameters of a first visible light signal 66. The first visible light signals 66 may be configured to encode information, such as the first game-relevant information 68. The receiving module 60 may be configured to receive, from user devices 26 separate from the physical object 46, first updated game-relevant information 74. The first updated game-relevant information 74 may be send from the user devices 26 via modulated visible light signals. The receiving module 60 may be configured to analyze one or more parameters of modulated visible light signals encoding the first updated game-relevant information 74 to determine from the one or more parameters, the first updated game-relevant information 74. Responsive to receiving the first updated game-relevant information 74, the storage module 56 may be configured to update the stored first game-relevant information 68 with the first updated game-relevant information 74 accordingly.

The server 12, user devices 26, and/or external resources 63 may be operatively linked via one or more electronic communication links. For example, such electronic communication links may be established, at least in part, via a network 26 such as the Internet and/or other networks. It will be appreciated that this is not intended to be limiting, and that the scope of this disclosure includes implementations in which servers 12, user devices 26, and/or external resources 63 may be operatively linked via some other communication media.

The external resources 63 may include sources of information, hosts and/or providers of virtual environments outside of system 10, external entities participating with system 10, and/or other resources. In some implementations, some or all of the functionality attributed herein to external resources 63 may be provided by resources included in system 10.

The server 12 may include electronic storage 24, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 24 may comprise electronic storage media that electronically stores information. The electronic storage media of electronic storage 24 may include one or both of system storage that is provided integrally (i.e., substantially non-removable) with server 12 and/or removable storage that is removably connectable to server 12 via, for example, a port or a drive. In some implementations, a port may comprise a USB port, a firewire port, and/or other suitable port. In some implementations, a drive may comprise a disk drive, and/or other suitable drive. Electronic storage 24,

34, 52 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 24, 34, 52 may include one or more virtual storage resources (e.g., cloud storage, a virtual private network, and/or other virtual storage resources). Electronic storage 24, 34, 52 may store software algorithms, information determined by processor 14, information received from server 12, information received from user devices 26, and/or other information that enables server 12, user devices 26, and physical objects 46 to function as described herein.

Processor(s) 14, 36, and 54 may be configured to provide information processing capabilities in server 12, user devices 26, and physical objects 46, respectively. As such, processors 14, 36, and 54 may include one or more of a digital processor, an analog processor, a digital circuit designed to process information, an analog circuit designed to process information, a state machine, and/or other mechanisms for electronically processing information. Although processors 14, 36, and 54 are shown in FIG. 1 as single respective entities, this is for illustrative purposes only. In some implementations, processors 14, 36, and 54 may include one or more processing units. These processing units may be physically located within the same device, or processors 14, 36, and 54 may represent processing functionality of a plurality of devices operating in coordination. The processors 14, 36, and 54 may be configured to execute modules 15, 16, 18, and 38, 40, 42, 44, and 56, 58, 60, respectively. Processors 14, 36, 54 may be configured to execute modules 15, 16, 18, and 38, 40, 42, 44, and 56, 58, 60, respectively, by software; hardware; firmware; some combination of software, hardware, and/or firmware; and/or other mechanisms for configuring processing capabilities on processors 14, 36, 54.

It should be appreciated that although modules 15, 16, 18, and 38, 40, 42, 44, and 56, 58, 60, are illustrated in FIG. 1 as being co-located within the respective single processing units, in implementations in which processors 14, 36, 54 includes multiple processing units, one or more of modules 15, 16, 18, and 38, 40, 42, 44, and 56, 58, 60, may be located remotely from the other modules. The description of the functionality provided by the different modules 15, 16, 18, and 38, 40, 42, 44, and 56, 58, 60, described above is for illustrative purposes, and is not intended to be limiting, as any of modules 15, 16, 18, and 38, 40, 42, 44, and 56, 58, 60, may provide more or less functionality than is described. For example, one or more of modules 15, 16, 18 may be eliminated, and some or all of its functionality may be provided by other ones of modules 15, 16, 18, and/or other modules. As another example, processor 14 may be configured to execute one or more additional modules that may perform some or all of the functionality attributed below to one of modules 15, 16, 18.

Figure 6:
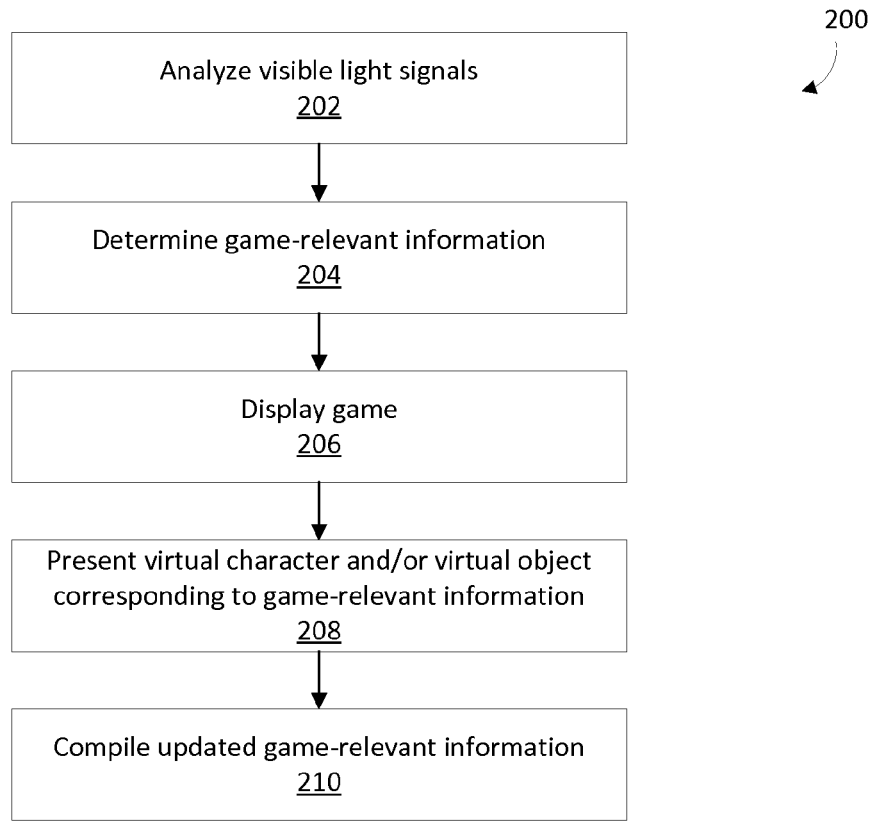
FIG. 6 illustrates a method for obtaining information relating to online games from physical objects using visible light communication.
Figure 7:
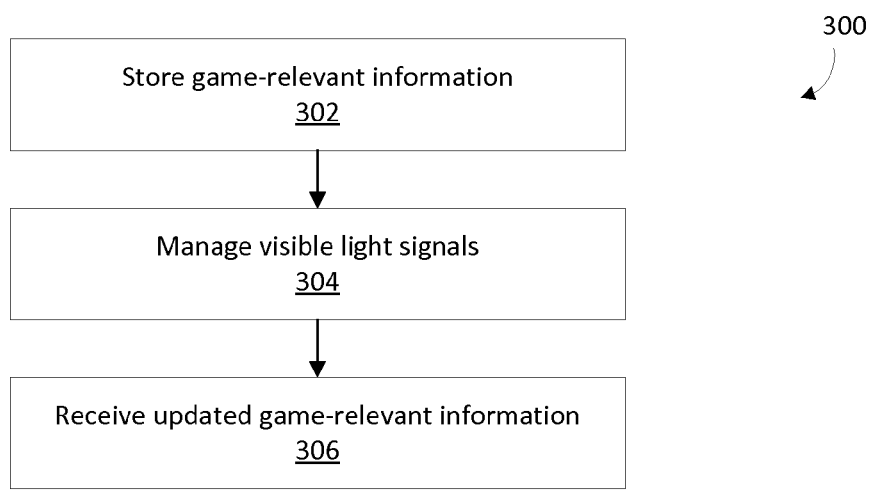
FIG. 7 illustrates a method for communicating information relating to online games from physical object to user devices associated with users of the online game.
Figure 8:
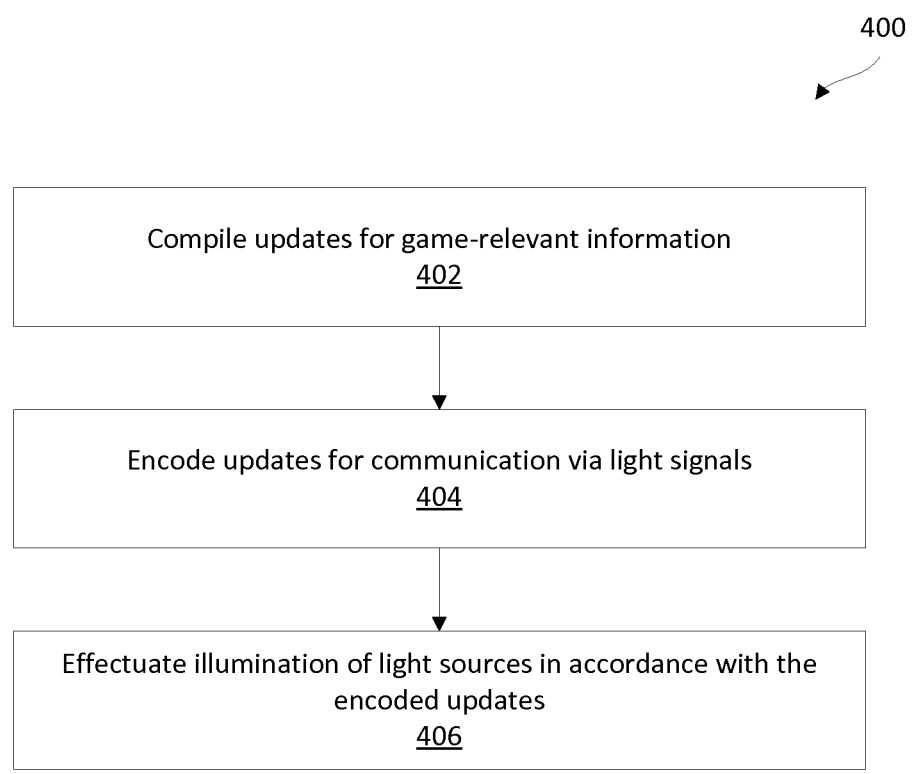
FIG. 8 illustrates a method for communicating information relating to online games from user devices to physical objects associated with users of the online game.

FIG. 6, FIG. 7, and FIG. 8 illustrate methods 200, 300, 400 respectively for communicating information between user devices and physical objects separate from the user devices using visible light communication. The operations of methods 200, 300, 400 presented below are intended to be illustrative. In some embodiments, methods 200, 300, 400 may be accomplished with one or more additional operations not described, and/or without one or more of the operations discussed. Additionally, the order in which the operations of methods 200, 300, 400 are illustrated in FIG. 6, FIG. 7, and FIG. 8, respectively, and described below are not intended to be limiting.

In some embodiments, methods 200, 300, 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 200, 300 in response to instructions stored electronically on an electronic storage medium. The one or more processing devices may include one or more devices configured through hardware, firmware, and/or software to be specifically designed for execution of one or more of the operations of methods 200, 300.

Referring now to method 200 in FIG. 6 for obtaining information relating to online games from physical objects using visible light communication, at an operation 202 one or more parameters of modulated, visible light signals are analyzed. The visible light signals may be signals which are received from a physical object configured to generate the signals. In some implementations, operation 202 may be performed by a translation module the same as or similar to translation module 40 (shown in FIG. 1 and described herein).

At an operation 204, game-relevant information associated with the physical object may be determined from the visible light signals. The game-relevant information may include one or more of identification information, game progress information, or co-play information associated with the physical object and a corresponding game. In some implementations, operation 204 may be performed by a translation module the same as or similar to the translation module 40 (shown in FIG. 1 and described herein).

At an operation 206, a game is displayed. In some implementations, operation 206 may be performed by a game module the same as or similar to game module 38 and/or game module 15 (shown in FIG. 1 and described herein).

At an operation 208, the presentation of a character or virtual object in the game corresponding to the physical object is effectuated. In some implementations, operation 206 may be performed by a game module the same as or similar to game module 38 and/or game module 15 (shown in FIG. 1 and described herein).

At an operation 210, updated game-relevant information is complied. The updates may correspond to gameplay in the game displayed at operation 206. In some implementations, operation 210 may be performed by a write module the same as or similar to the write module 44 (shown in FIG. 1 and described herein).

Referring now to method 300 in FIG. 7 for communicating information relating to online games to user devices associated with users of the online game, at an operation 302, game-relevant information may be stored. The game-relevant information may include one or more of identification information, game progress information, or co-play information associated with the physical object and a corresponding game. In some implementations, operation 302 may be performed by a storage module the same as or similar to the storage module 56 (shown in FIG. 1 and described herein).

At an operation 304, visible light signals are managed. The visible light signals maybe characterized by one or more of frequency, color, or intensity. The visible light signals may be used to communicate information to user devices. In some implementations, operation 304 may be performed by an illumination communication module the same as or similar to illumination communication module 58 (shown in FIG. 1 and described herein).

At an operation 306, updated game-relevant information is received. The updated game-relevant information may be received from user devices 26 in correspondence to gameplay in a game. In response to receiving the updated game-relevant information, the game-relevant information stored at operation 302 may be updated accordingly. In some implementations, operation 306 may be performed by a receiving module the same as or similar to the receiving module 60 (shown in FIG. 1 and described herein).

Referring now to method 400 in FIG. 8 for communicating information updates relating to online games from user devices to physical objects associated with users of the online game, at an operation 402, updated game-relevant information may be complied. The updates to the game-relevant information may be in accordance to gameplay in the online game by the user associated with a user device and physical object. In some implementations, operation 402 may be performed by a write module the same as or similar to the write module 44 (shown in FIG. 1 and described herein).

At an operation 404, the updated game-relevant information may be encoded for communication via light signals. In some implementations, operation 404 may be performed by a write module the same as or similar to write module 44 (shown in FIG. 1 and described herein).

At an operation 406, light sources may be illuminated in accordance with the encoded light signals. In some implementations, operation 306 may be performed by a write module the same as or similar to the write module 44 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for communicating information relating to online games between user devices and physical objects, the system comprising:
    a user device comprising:
        one or more light sources;
        one or more sensors configured to capture modulated visible light emitted from a physical object that is separate from the user device; and
        one or more physical processors configured by machine-readable instructions to:
            analyze one or more parameters of the modulated visible light, and determine from the one or more parameters of the modulated visible light game-relevant information associated with the physical object;
            effectuate display of a game to a user, and to use the game-relevant information to effectuate presentation of a character or virtual object in the online game that corresponds to the physical object; and
            encode updated game-relevant information into a command signal, the command signal being configured to facilitate generation of encoded modulated visible light by the one or more light sources for reception by the physical object.

2. The system of claim 1, wherein the one or more physical processors of the user device are further configured by machine-readable instructions to:
    effectuate display of augmented realty simulations of the physical object to the user.

3. The system of claim 1, wherein the one or more physical processors of the user device are further configured by machine-readable instructions to:
    compile the updated game-relevant information based on gameplay in the online game.

4. The system of claim 1, wherein the one or more physical processors are further configured by machine-readable instructions to effectuate generation of the encoded modulated visible light by the one or more light sources for reception by the physical object.

5. The system of claim 1, wherein the one or more physical processors of the user device are further configured by machine-readable instructions to:
    execute an instance of the online game, and implement the instance of the online game to facilitate participation of users in the online game, wherein the instance of the online game comprises a presentation of a character or object in the online game corresponding to game-relevant information determined from the captured modulated light.

6. The system of claim 5, wherein the one or more physical processors of the user device are further configured by machine-readable instructions such that executing the instance of the online game is performed locally by the one or more physical processors of the user device.

7. The system of claim 1, further comprising one or more servers remote from the user device, wherein the one or more servers include one or more physical processors configured by machine-readable instructions to execute an instance of the online game for access by the user device, wherein the instance of the online game comprises a presentation of a character or object in the online game corresponding to game-relevant information determined from the captured modulated light.

8. The system of claim 1, wherein the one or more physical processors of the user device are further configured by machine-readable instructions such that game-relevant information includes one or more of identification information, game progress information, or co-play information associated with the physical object.

9. The system of claim 1, wherein modulated visible light captured by the one or more sensors is characterized by one or more of a frequency, color, pulse duration, phase shifts, code, or intensity.

10. A method for obtaining information relating to online games from physical objects using light communication, the method being implemented in a user device that includes one or more light sources, one or more light sensors, one or more physical processors, and storage media storing machine-readable instructions, the method comprising:
    analyzing one or more parameters of modulated visible light emitted from a physical object which is separate from the user device;
    determining from the one or more parameters of the modulated visible light, game-relevant information associated with the physical object;
    effectuating display of an online game to a user;
    effectuating presentation of a character or virtual object in the online game that corresponds to the physical object using the game-relevant information; and
    encoding updated game-relevant information into a command signal, the command signal being configured to facilitate generation of encoded modulated visible light by the one or more light sources for reception by the physical object.

11. The method of claim 10, further comprising:
effectuating display of augmented realty simulations of the physical object to the user.

12. The method of claim 10, further comprising:
compiling the updated game-relevant information based on gameplay in the online game.

13. The method of claim 10, wherein the method further comprises:
effectuate generation of the encoded modulated visible light by the one or more light sources for reception by the physical object.

14. The method of claim 10, further comprising:
executing an instance of the online game, and implementing the instance of the online game to facilitate participation of users in the online game, wherein the instance of the online game comprises a presentation of a character or object in the online game corresponding to game-relevant information determined from the captured modulated visible light.

15. The method of claim 14, wherein executing the instance of the online game is performed locally by the one or more physical processors of the user device.

16. The method of claim 14, wherein executing the instance of the online game is performed by one or more servers remote from the user device, wherein the one or more servers include one or more physical processors configured by machine-readable instructions to execute the instance of the online game for access by the user device.

17. The method of claim 10, wherein the game-relevant information includes one or more of identification information, game progress information, or co-play information associated with the physical object.

18. The method of claim 10, wherein the modulated visible light is characterized by one or more of a frequency, color, pulse duration, phase shifts, code, or intensity.

19. A system for communicating information relating to online games between user devices associated with users of the online game and physical objects, the system comprising:
a physical object comprising:
  a first light source configured to generate modulated visible light; and
  a first sensor configured to capture modulated visible light; and
a user device comprising:
  a second light source configured to generate modulated visible light;
  a second sensor sensors configured to capture modulated visible light emitted from the physical object; and
  one or more physical processors configured by machine-readable instructions to:
    analyze one or more parameters of modulated visible light generated by the physical object, and determine from the one or more parameters of the modulated visible light game-relevant information associated with the physical object;
    effectuate display of a game to a user, and to use the game-relevant information to effectuate presentation of a character or virtual object in the online game that corresponds to the physical object; and
    encode updated game-relevant information into a command signal, the command signal being configured to facilitate generation of encoded modulated visible light by the one or more light sources for reception by the physical object.

* * * * *